(12) United States Patent
Shoda et al.

(10) Patent No.: US 7,783,369 B2
(45) Date of Patent: Aug. 24, 2010

(54) REMOTE MAINTENANCE SYSTEM

(75) Inventors: Kazuo Shoda, Tokyo (JP); Yuki Nomura, Tokyo (JP); Yoshifumi Nagato, Tokyo (JP)

(73) Assignee: THK Co., Ltd., Tokyo (JP)

( * ) Notice: Subject to any disclaimer, the term of this patent is extended or adjusted under 35 U.S.C. 154(b) by 188 days.

(21) Appl. No.: 11/660,608

(22) PCT Filed: Aug. 24, 2005

(86) PCT No.: PCT/JP2005/015316
§ 371 (c)(1),
(2), (4) Date: Feb. 23, 2007

(87) PCT Pub. No.: WO2006/022276
PCT Pub. Date: Mar. 2, 2006

(65) Prior Publication Data
US 2007/0282465 A1    Dec. 6, 2007

(30) Foreign Application Priority Data
Aug. 25, 2004   (JP) .............................. 2004-245650

(51) Int. Cl.
*G05B 13/02* (2006.01)
(52) U.S. Cl. .............................. 700/45; 700/1; 700/110; 355/72
(58) Field of Classification Search .................... 700/1, 700/45, 110; 355/72
See application file for complete search history.

(56) References Cited
U.S. PATENT DOCUMENTS
6,553,238 B1   4/2003   Ginzel et al.

2003/0179359 A1*   9/2003   Korenaga .................... 355/75
2007/0005158 A1*   1/2007   Nicolson et al. ............. 700/69

FOREIGN PATENT DOCUMENTS

| CN | 1225774 A | 8/1999 |
|---|---|---|
| JP | 11-15520 A | 1/1999 |
| JP | 2002-287816 A | 10/2002 |

(Continued)

OTHER PUBLICATIONS

Yuji Wattabe et al., "Mitsubishi Denki ni Okeru CNC Open-ka no Torikumi", Kikai Gijutsu, Nov. 1, 2000; vol. 48, No. 12, full text.

(Continued)

*Primary Examiner*—Albert DeCady
*Assistant Examiner*—Tejal J Gami
(74) *Attorney, Agent, or Firm*—Westerman, Hattori, Daniels & Adrian, LLP

(57) ABSTRACT

A remote maintenance system 1 is provided with a linear motor apparatus 2, a motor driver 3 for controlling a motor of the linear motion apparatus 2, and a user terminal 4. The motor driver 3 includes a memory which stores parameters relating to motor control. The user terminal 4 acquires the parameters from the motor driver 3, and sends the parameters to a maintenance server 5. Then, the user terminal 4 receives the parameters adjusted by the maintenance servers from the maintenance server 5, and writes the parameter into the memory of the motor driver 3. Thus, the parameters of the linear motion apparatus can be adjusted from remote locations at a high precision.

7 Claims, 6 Drawing Sheets

FOREIGN PATENT DOCUMENTS

JP      2003-163154 A     6/2003

OTHER PUBLICATIONS

International Search Report of PCT/JP2005/015316, date of mailing Sep. 27, 2005.

Yuji Watanabe et al., "Mitsubishi Denki ni Okeru CNC Open-ka no Torikumi", Kikai Gijutsu, Nov. 1, 2000; vol. 48, No. 12, full text.

Chinese Office Action dated Oct. 17, 2008, issued in corresponding Chinese Application No. 20050028480.1.

* cited by examiner

REMOTE MAINTENANCE SYSTEM

TECHNICAL FIELD

The present invention relates to a technique for executing maintenance of a linear motion apparatus from a remote location.

BACKGROUND ART

Conventionally, a linear motion apparatus such as a linear guide and ball screw has been widely used. In this kind of the linear motion apparatus, a linear motor or servo motor is utilized to drive a movable body, and the position, speed and acceleration of the movable body are controlled by changing current supplied from a motor driver (motor control apparatus).

In general, a variety of parameters relating to motor control are set in a memory of the motor driver. Examples of the parameters include rated current to be supplied to a motor, a maximum current value for determining an overload to a motor, resolution for detecting the position of a movable body, and a control parameter (time constant and gain) for use in feedback control. These parameters need to be set to an appropriate value corresponding to use conditions of a user at the time of installation of a linear motion apparatus. Maintenance after the installation is also important.

DISCLOSURE OF THE INVENTION

Problem to be Solved by the Invention

However, the above-described parameter adjustment requires advanced skill. Particularly, control parameters for use in feedback control need to be adjusted finely by actually observing changes in current supplied to a motor. For this reason, it is very difficult for a user to adjust such parameters independently. Therefore, conventionally, a person skilled in maintenance must go to a place where the linear motion apparatus has been installed to execute a parameter adjustment work.

The present invention has been achieved in views of the above-described circumstances, and an object of the invention is to provide a technique capable of adjusting parameters of the linear motion apparatus with high precision from remote locations without necessity of going to a place where the linear motion apparatus has been installed.

Means for Solving the Problem

To achieve the above-mentioned object, the present invention adopts the following configuration.

According to a first aspect of the present invention, a remote maintenance system includes: a linear motion apparatus that is driven by a motor; a motor control apparatus for controlling the motor of the linear motion apparatus; and an information processing apparatus that is connected to the motor control apparatus and capable of communicating with a maintenance server through an electric communication line. The motor control apparatus includes storage means for storing parameters relating to motor control. The information processing apparatus includes: acquiring means for acquiring the parameters from the motor control apparatus; sending means for sending the acquired parameter to the maintenance server; receiving means for receiving a parameter adjusted by the maintenance server from the maintenance server; and writing means for writing the received parameter into the storage means of the motor control apparatus.

With this configuration, it is possible in the maintenance server to confirm the content of the parameters of the linear motion apparatus, adjust parameters, and write adjusted parameters into the motor control apparatus. Accordingly, it is possible to adjust the parameters of the linear motion apparatus from a remote location without going to a place where the linear motion apparatus has been installed.

Preferably, the motor control apparatus further includes detecting means for detecting a value of current or voltage supplied to the motor of the linear motion apparatus, and the information processing apparatus is configured such that the acquiring means acquires a parameter and a change in current or a change in voltage which is detected when the motor is controlled based on the parameter, from the motor control apparatus, and that the sending means sends the change in current or the change in voltage and the parameter to the maintenance server.

With this configuration, changes in current (voltage) supplied to the motor of the linear motion apparatus can be observed in the maintenance server. Consequently, highly accurate and reliable parameter adjustment can be carried out.

Preferably, the parameter includes a control parameter for use in feedback control of the linear motion apparatus. Examples of the control parameter include a loop gain and a time constant.

Adjustment history of the parameter is preferred to be accumulated in the maintenance server. Consequently, know-how about the parameter adjustment can be accumulated, so that effects such as acceleration of correspondence to troubles, realization of knowledge base, and automatization of the parameter adjustment can be expected.

In the meantime, the present invention can be grasped as a remote maintenance system, an information processing apparatus, a motor control apparatus or a maintenance server having at least a part of the aforementioned means. Further, the present invention can be grasped as a remote maintenance method including at least a part of the above-described processings or a remote maintenance program which causes the information processing apparatus to execute the method. The aforementioned means and processings can constitute the present invention by combination thereof as much as possible.

For example, according to a second aspect of the present invention, there is provided a remote maintenance method, wherein an information processing apparatus, that is connected to a motor control apparatus for controlling a motor of a linear motion apparatus and is capable of communicating with a maintenance server through an electric communication line, acquires a parameter that is relating to motor control and is stored in storage means of the motor control apparatus from the motor control apparatus, sends the acquired parameter to the maintenance server, receives a parameter adjusted by the maintenance server from the maintenance server, and writes the received parameter into the storage means of the motor control apparatus.

According to a third aspect of the present invention, there is provided a remote maintenance program for causing an information processing apparatus, which is connected to a motor control apparatus for controlling a motor of a linear motion apparatus and is capable of communicating with a maintenance server through an electric communication line, to execute: a processing for acquiring a parameter that is relating to motor control and is stored in storage means of the motor control apparatus from the motor control apparatus; a processing for sending the acquired parameter to the maintenance server; a processing for receiving a parameter adjusted by the maintenance server from the maintenance server; and a processing for writing the received parameter into the storage means of the motor control apparatus.

EFFECT OF THE INVENTION

The present invention enables the parameter adjustment of the linear motion apparatus to be carried out with high precision from a remote location without necessity of going to a place where the linear motion apparatus has been installed. Consequently, reduction of working load of maintenance, reduction of cost and acceleration of correspondence to troubles can be achieved.

BEST MODE FOR CARRYING OUT THE INVENTION

Hereinafter, preferred embodiments of the present invention will be described in detail by way of example with reference to the accompanying drawings.

FIG. 1 shows the configuration of a remote maintenance system according to an embodiment of the present invention. As shown in FIG. 1, the remote maintenance system 1 of this embodiment comprises a linear motion apparatus 2, a motor driver (motor control apparatus) 3 for controlling the linear motion apparatus 2, and a user terminal (information processing apparatus) 4 connected to the motor driver 3. The user terminal 4 can communicate with a maintenance server 5 through Internet (electric communication line) 6.

The linear motion apparatus 2 comprises a base unit 20 and a slider (movable body) 21 provided slidably with respect to the base unit 20. According to this embodiment, two linear guides 22 are employed as a linear motion mechanism of the slider 21, and two rails 22a are arranged on both the sides of the base unit 20 while two blocks 22b are mounted on the rear face of the slider 21. A plurality of rolling bodies (balls or rollers) are interposed between the rail 22a and the block 22b, and when the slider 21 is moved, a smooth linear motion is achieved by a rolling motion of the rolling bodies.

A linear motor 23 is employed as the driving means of the slider 21. A magnet plate 23a made of a permanent magnet is provided on the bottom face of the base unit 20, and a movable element 23b is fixed to the bottom portion of the slider 21. The position, speed and acceleration of the slider 21 can be controlled by appropriately changing the magnetic force and polarity of the movable element 23b by means of the motor driver 3.

A linear encoder 24 serving as position detecting means is used to detect the position, speed and acceleration of the slider 21. A linear scale 24a attached to the base unit 20 is read by a head 24b fixed to the slider 21. A detection result of the linear encoder 24 is inputted to the motor driver 3 and provided for feedback control of the linear motor 23.

FIG. 2 is a block diagram showing the functional configuration of the motor driver 3. The motor driver 3 includes a control unit 30, a memory 31 and a current detecting unit 32.

The control unit 30 modulates the frequency and amplitude of current in each phase of U, V and W according to a set control program, and supplies the three-phase alternating current to the linear motor 23. The linear motor 23 is actuated by the supplied current so that the slider 21 is moved. Information on the position, speed and acceleration of the slider 21 are detected by the linear encoder 24 and inputted successively into the control unit 30. The control unit 30 feedback controls the current supplied to the linear motor 23 on the basis of the detection result so as to cause the slider 21 to execute a desired motion.

FIG. 3 is a block diagram conceptually showing a feedback control system. As indicated in this block diagram, the embodiment is provided an acceleration loop as well as a position loop and a speed loop. Provision of the acceleration loop enables essential disturbance suppression control. The control parameter for use in feedback control includes a position loop time constant Tp, a speed loop time constant Tv, and an acceleration loop gain KA. Further, a gain KL is used for adjusting servo stiffness.

These control parameters are stored in the memory 31. The memory 31 is rewritable nonvolatile storage means such as an electrically erasable programmable read-only memory (EEPROM). The memory 31 stores therein a variety of parameters for motor control as well as the aforementioned control parameters. The control unit 30 executes motor control by referring to these parameters appropriately.

Examples of the parameters other than the control parameter include resolution of the linear encoder 24, rated current to be supplied to the linear motor 23, a maximum current value (error determining value) for determining an overload, maximum speed of the slider 21, acceleration/deceleration characteristics, and a home position of the slider 21. The setting value of any parameter can be changed.

The current detecting unit (current sensor) 32 is a detecting means for detecting a value of current supplied to the linear motor 23. The current detecting unit 32 monitors current flowing in a current supply line and converts its waveform (change in current) to a digital signal.

The user terminal 4 can be constituted of a general-purpose computer including a central processing unit (CPU), a main storage unit, an auxiliary storage unit, a display unit, an input unit, an external I/F, a network I/F and the like. The user terminal 4 is connected to the motor driver 3 through the external I/F and further connected to the internet 6 through the network I/F.

In the user terminal 4, a program stored in the auxiliary storage unit is read into the main storage unit and executed by the CPU so as to achieve functions necessary for execution of the remote maintenance. Examples of the main functions include a function (acquiring means) for acquiring various parameters set in the memory 31 of the motor driver 3 and a detection result of the current detecting unit 32, a function (sending means) for sending the acquired parameters and the like to the maintenance server 5, a function (receiving means) for receiving a parameter from the maintenance server 5, a function (writing means) for writing a parameter into the memory 31 of the motor driver 3, and a function for sending/receiving an electronic mail.

(Maintenance Processing)

The aforementioned parameters need to be set to an appropriate value corresponding to the driving conditions (speed, acceleration, load applied to the slider 21, and the like) of the linear motion apparatus 2. If an inappropriate value is set, the linear motion apparatus 2 may get into fault, malfunction, trouble or the like.

Hereinafter, the maintenance processing for setting a parameter to an appropriate value will be described in detail with reference to FIGS. 4 to 6. FIGS. 4 and 5 are sequence diagrams showing flows of respective processings of the user terminal 4, the motor driver 3, the linear motion apparatus 2 and the maintenance server 5. FIG. 6 is an example of a parameter display screen displayed on the maintenance server 5.

Processing Example 1

In the processing example of FIG. 4, the user terminal 4 first acquires a value of each parameter from the motor driver 3 (step S100). Then, the user terminal 4 converts information of each parameter to communication parameter data of a predetermined format, and sends the parameter data to the maintenance server 5 (step S101).

This embodiment uses parameter data of a format combining an identification number with a value of a parameter. For example, if an identification number of a parameter "time constant of position loop" is "01" and its set value is "50", data of "01, 50" is sent. If there are plural parameters, for example, they can be repeated like "01, 50; 02, 100; ...". It is recommendable to incorporate identification information (for example, a manufacturing number) for specifying the motor driver 3 or the linear motion apparatus 2 in the parameter data.

When the maintenance server 5 receives parameter data from the user terminal 4, it analyzes the received data and displays a value of each parameter on a display unit. The name, value and settable range of each parameter are displayed on the parameter display screen (see the left screen of FIG. 6). An OK button and a cancel button are also provided on the parameter display screen. In an initial display, a value received from the user terminal 4 is displayed.

Usually, the maintenance server 5 is operated by technical support personnel of the linear motion apparatus 2. The personnel reviews values displayed on the parameter display screen by communicating with a user of the linear motion apparatus 2 by, for example, telephone or electronic mail when necessary to confirm whether or not the usage environments of the user or driving conditions meet the parameter value. If the parameter value is inappropriate, the operator adjusts it to an appropriate value on the parameter display screen (step S103).

After adjustment of the parameter is finished, the operator presses the OK button. Then, the maintenance server 5 converts information of each parameter to parameter data and sends the data to the user terminal 4 (step S104). Although all the parameters may be sent, it is preferably to send information about only a parameter with its value changed from viewpoints of acceleration and simplification of the processing. For example, if only the value of time constant of the position loop is changed to "60", data of "01, 60" is sent.

The maintenance server 5 records a series of processing contents relating to the parameter adjustment in database (step S105). Consequently, adjustment history of the parameter is accumulated in the maintenance server 5.

When the user terminal 4 receives parameter data from the maintenance server 5, it analyzes the data. As for a changed parameter, a value after the change is written into the motor driver 3 so as to update the parameter (step S106). Subsequently, motor control is implemented with a new parameter.

Processing Example 2

In the processing example of FIG. 5, the user terminal 4 first sends an automatic operation instruction to the motor driver 3 (step S200). Then, the motor driver 3 executes the motor control following a current parameter setting (step S201) so as to execute an automatic operation of the linear motion apparatus (step S202). The motor driver 3 detects a value of current supplied during the automatic operation by means of the current detecting unit 32 and records its waveform (change in current) (step S203).

Next, the user terminal 4 acquires the value of each parameter from the motor driver 3 and the change in current detected in step S203 (step S204). Then, the user terminal 4 converts information of each parameter and change in current to communication parameter data of a predetermined format and sends the parameter data to the maintenance server 5 (step S205).

When the maintenance server 5 receives parameter data from the user terminal 4, it analyzes the data and displays a value of each parameter on the display unit in the same manner as in the processing example 1 (step S206). At this time, the waveform of supplied current is also displayed on the parameter display screen (see the right screen in FIG. 6).

When the control parameter such as time constant and loop gain is set appropriately so that stable control is attained, the supplied current also presents a stabilized waveform. However, if the control parameter is inappropriate, abnormal sound or vibration occurs in the linear motion apparatus 2, and an abnormal waveform corresponding thereto appears in the supplied current. Therefore, the operator of the maintenance server 5 can adjust the value of the control parameter with high precision by observing the waveform of the supplied current (step S207).

The processing (steps S208 to S210) after the parameter adjustment is the same as that of the processing example 1 (steps S104 to S106).

According to the configuration of this embodiment described above, the maintenance server 5 allows the content of the parameter in the linear motion apparatus 2 to be confirmed, the parameter to be adjusted, and the parameter after the adjustment to be written into the motor driver 3. Therefore, the parameter adjustment in the linear motion apparatus 2 can be carried out from a remote place without actually going to the place where the linear motion apparatus 2 has been installed.

Further, in the processing example 2, the change in current supplied to the linear motor 23 of the linear motion apparatus 2 can be observed in the maintenance server 5, thereby achieving high precision, highly reliable parameter adjustment.

Further, know-how about the parameter adjustment is accumulated by accumulating the adjustment history of the parameter, so that effects such as acceleration of correspondence to troubles, achievement of knowledge base, and automatization of parameter adjustment can be expected.

In the meantime, the above-mentioned embodiment is only an exemplification of embodiments of the present invention. The present invention should not be limited to the above-mentioned embodiment, but may be modified into various ways within the scope of the technical idea.

For example, a plurality of motor drivers 3 may be connected to one user terminal 4. The maintenance server 5 can communicate with a plurality of user terminals 4. Further, a plurality of maintenance servers 5 are preferred to be provided, and in this case, it is recommendable to distribute an access load from the user terminal 4. Preferably, database for accumulating the adjustment history of the parameters is shared by the plurality of maintenance servers 5.

Although in the above-described embodiment, the user terminal 4 and the motor driver 3 are composed of different apparatus, the both functions may be installed in an identical apparatus.

Although the above embodiment adopts a linear guide as the linear motion mechanism, a ball screw, a roller screw, a ball spline or a combination thereof may be preferably adopted.

As the drive means of the linear motion mechanism, a rotation type servo motor may be adopted instead of the linear motor, and as the position detecting means for the slider, a rotary encoder may be adopted instead of the linear encoder.

Although in the above embodiment, the waveform of supplied current is detected, the waveform of supplied voltage is detected if the motor is voltage-controlled.

Figure 1:
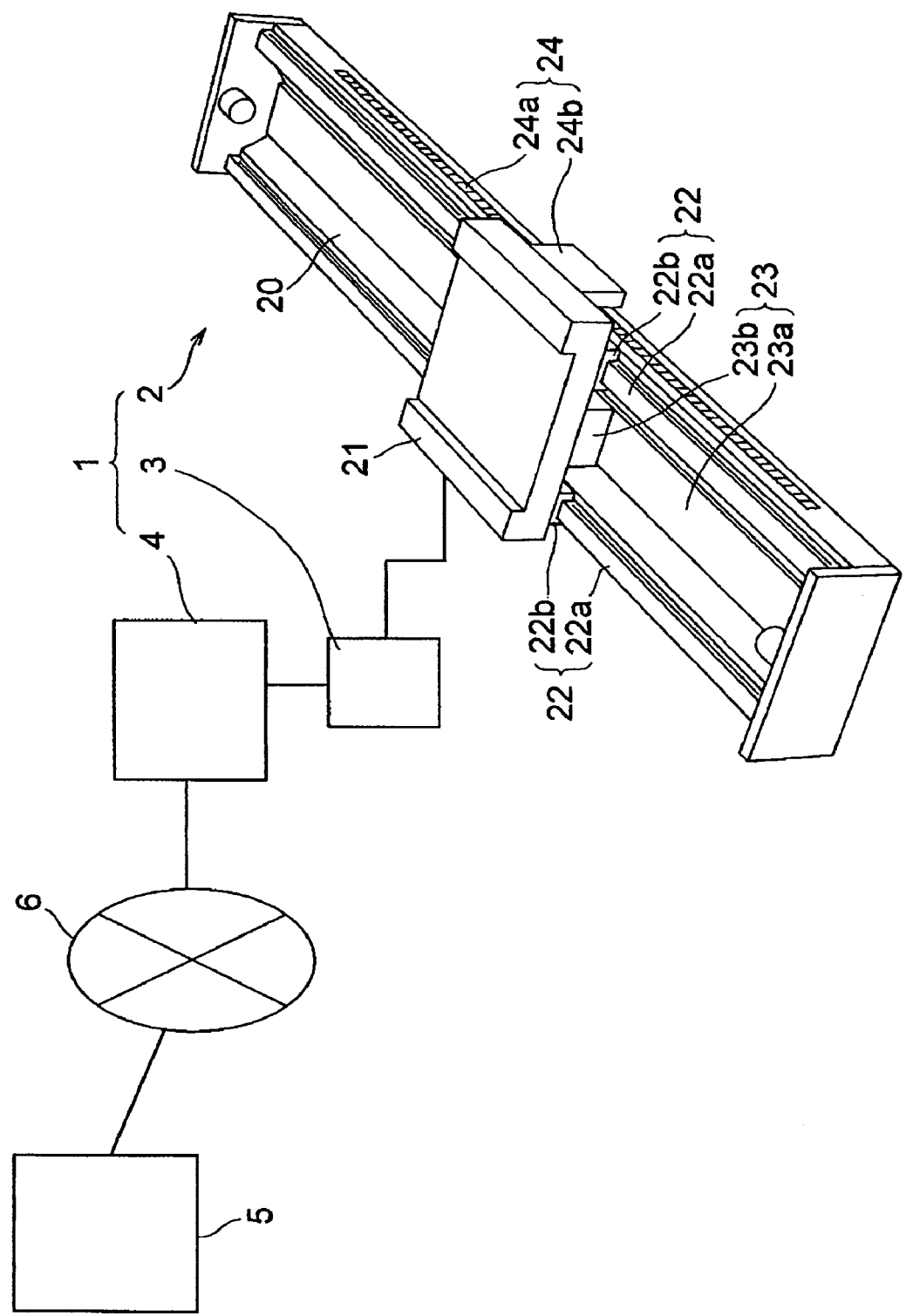
FIG. 1 is a diagram showing the configuration of a remote maintenance system according to an embodiment of the present invention.
Figure 2:
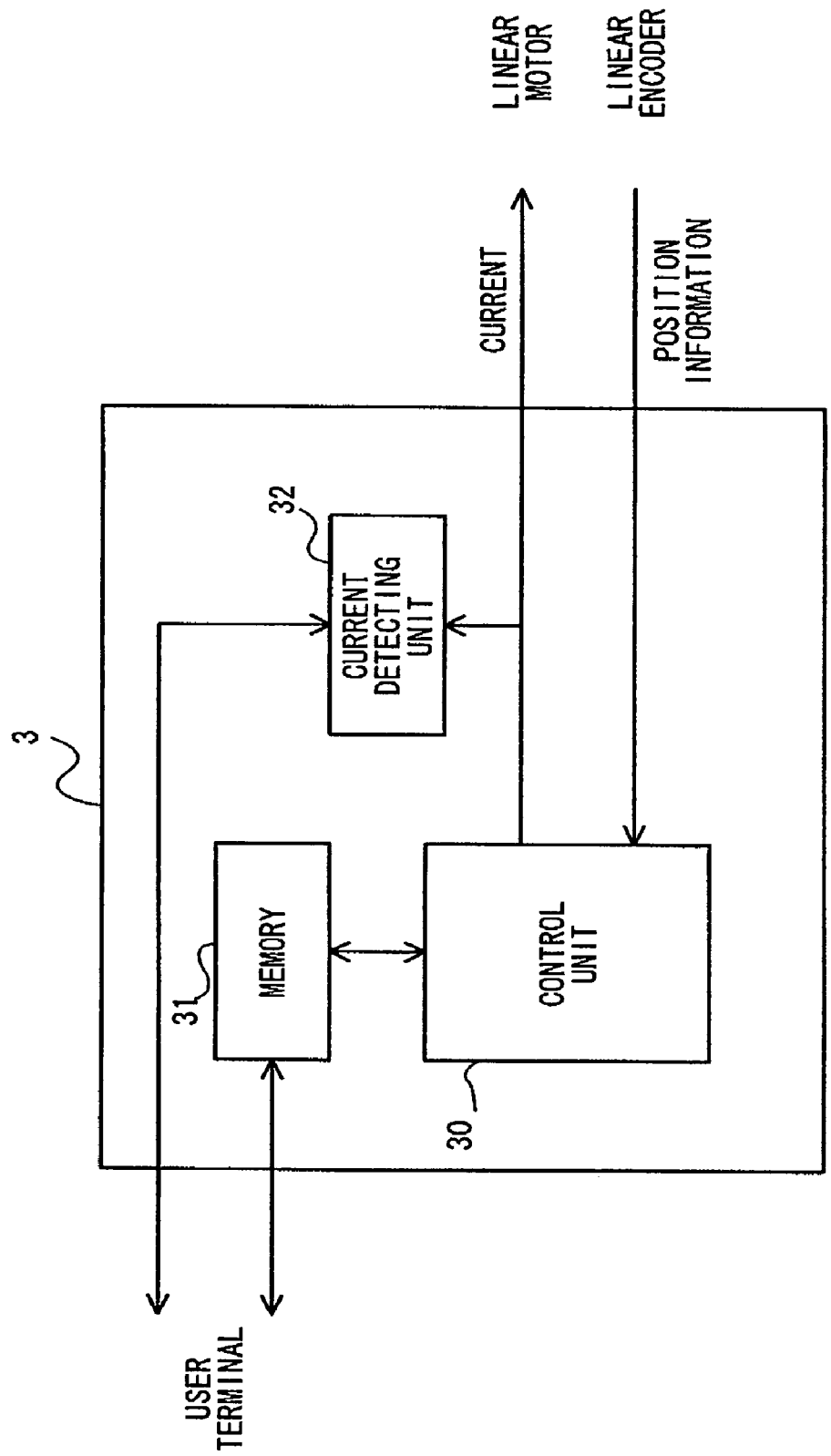
FIG. 2 is a block diagram showing the functional configuration of a motor driver.
Figure 3:
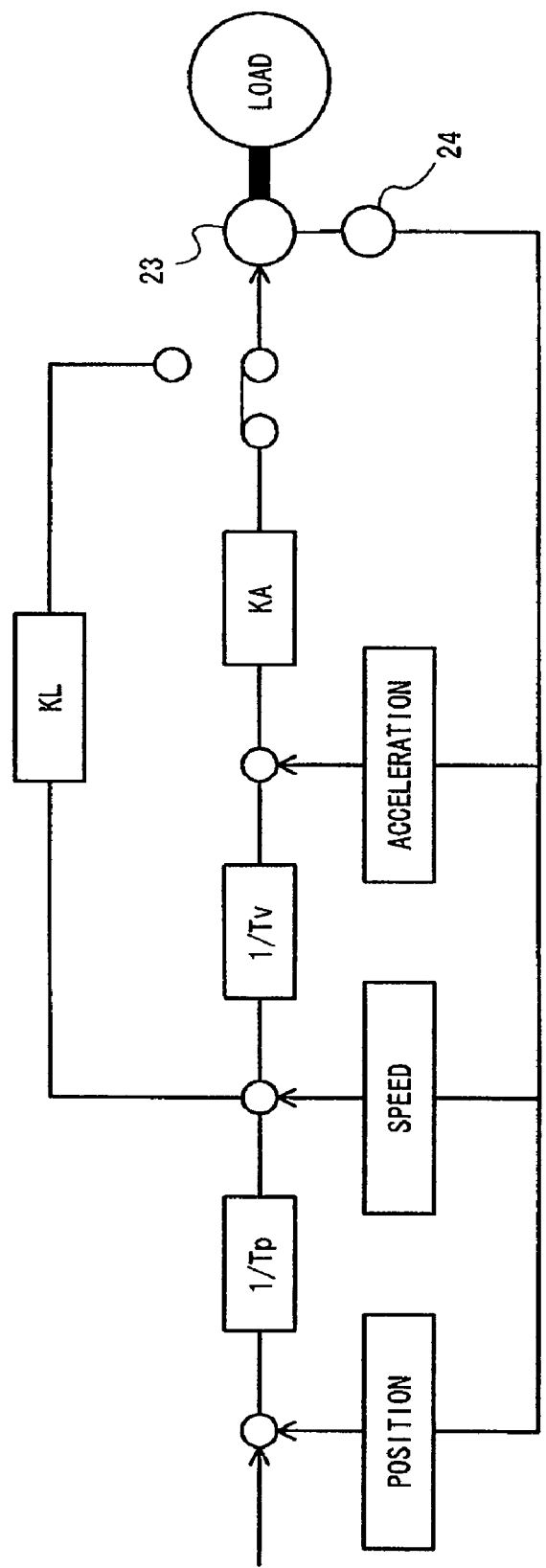
FIG. 3 is a block diagram conceptually showing a feedback control system.
Figure 4:
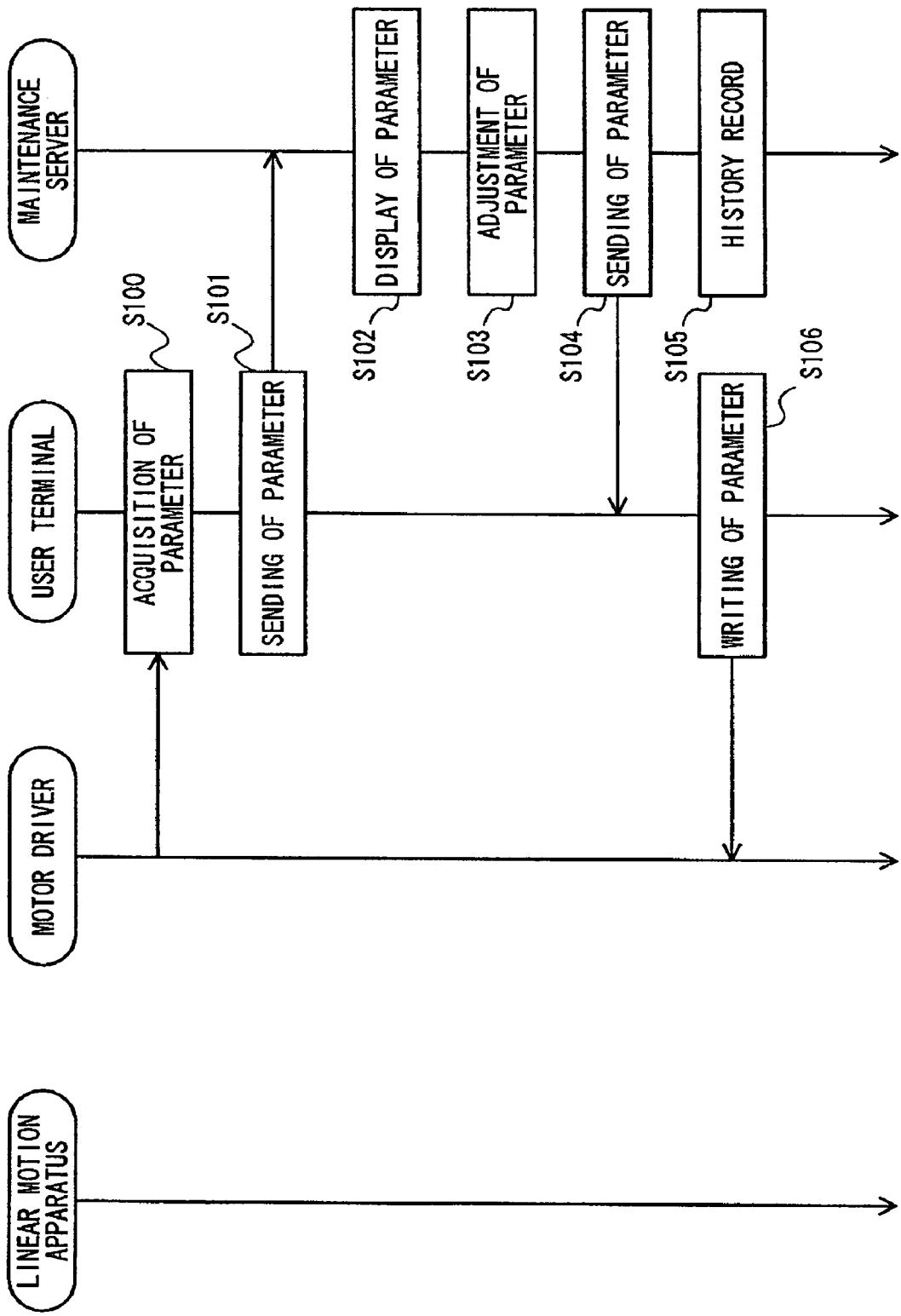
FIG. 4 is a sequence diagram showing a flow of maintenance processing according to Processing example 1.
Figure 5:
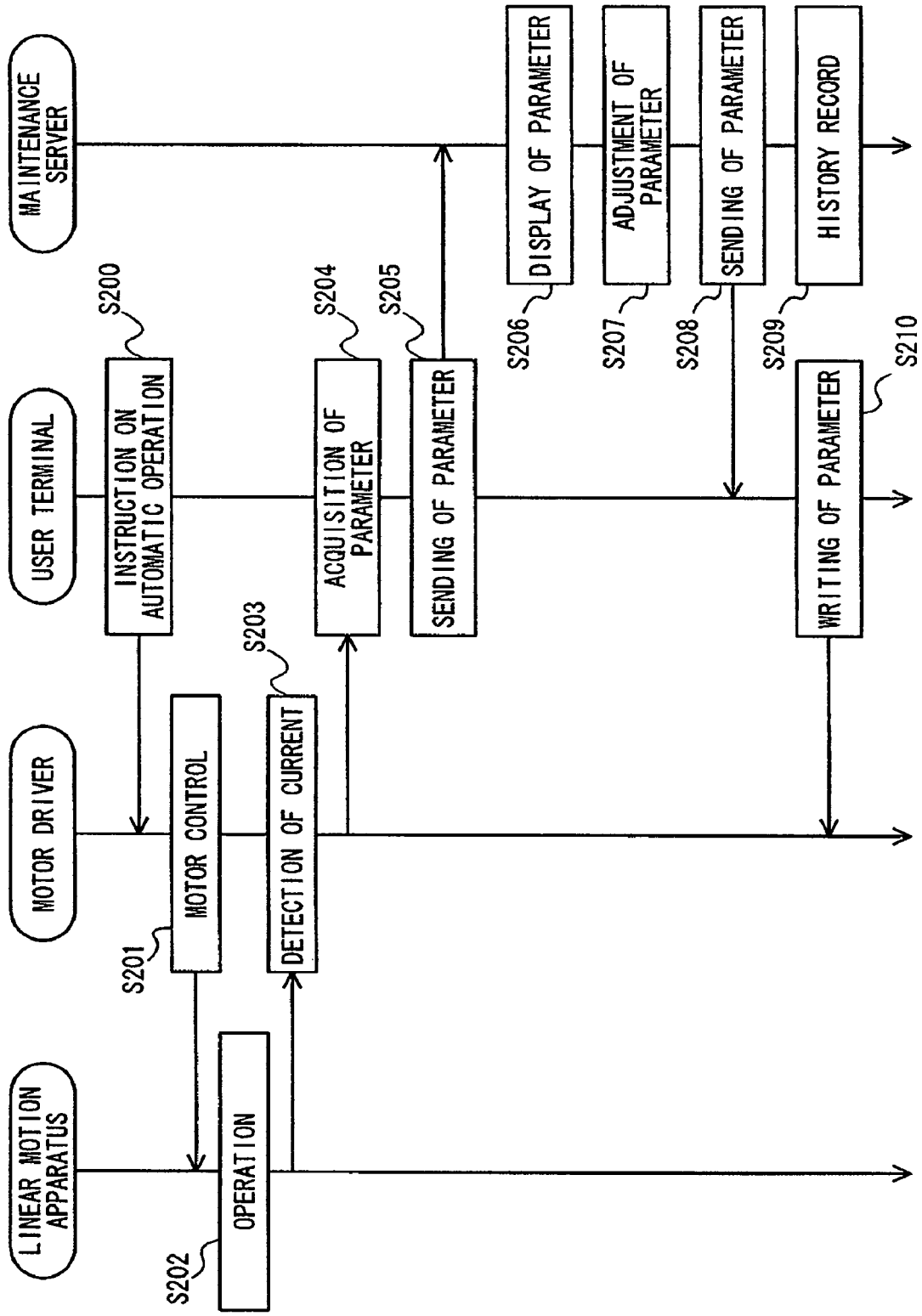
FIG. 5 is a sequence diagram showing a flow of maintenance processing according to Processing example 2.
Figure 6:
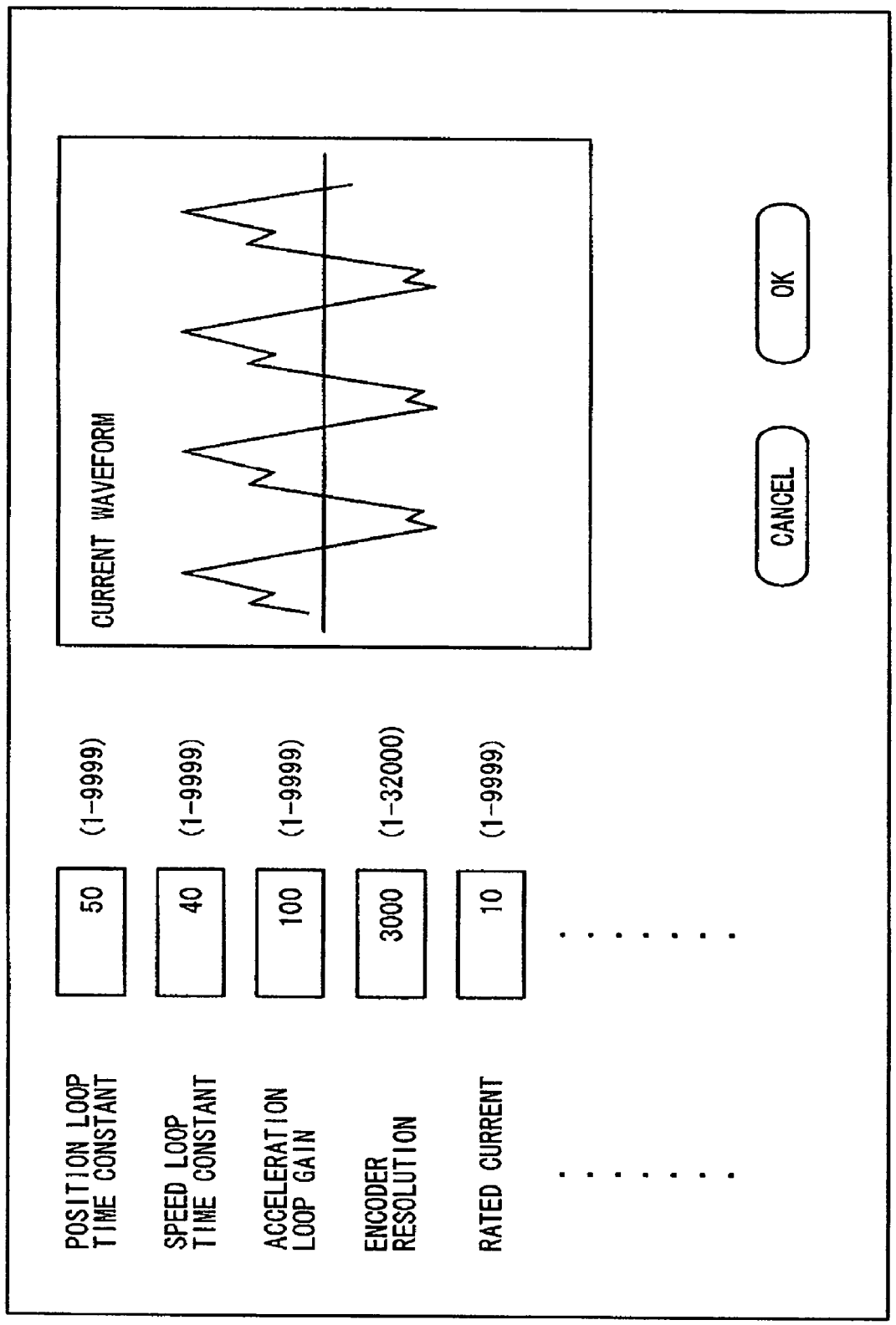
FIG. 6 is a view showing an example of a parameter display screen.

DESCRIPTION OF THE REFERENCE NUMERALS 1 remote maintenance system
2 linear motion apparatus
3 motor driver (motor control apparatus)
4 user terminal (information processing apparatus)
5 maintenance server
6 Internet (electric communication line)
20 base unit
21 slider (movable body)
22 linear guide
23 linear motor
24 linear encoder
30 control unit
31 memory (storage means)
32 current detecting unit (detecting means)

The invention claimed is:

1. A remote maintenance system comprising:
a maintenance server, a linear motion apparatus that is driven by a motor;
a motor control apparatus for controlling the motor of the linear motion apparatus; and
an information processing apparatus that is connected to the motor control apparatus and communicates with the maintenance server through an electric communication line, wherein the motor control apparatus includes storage means for storing a parameter relating to motor control, and the information processing apparatus includes:
acquiring means for acquiring the parameter from the motor control apparatus;
sending means for sending the acquired parameter to the maintenance server;
receiving means for receiving a parameter adjusted by the maintenance server from the maintenance server; and writing means for writing the received parameter into the storage means of the motor control apparatus, and the maintenance server receives the parameter sent by the information processing apparatus, prompts an operator to adjust the received parameter while displaying the received parameter and sends the adjusted parameter to the information processing apparatus, and wherein the information processing apparatus, when receiving the parameter adjusted by the maintenance server, writes the received parameter into the storage means of the motor apparatus automatically without human interaction, wherein said parameters relating to motor control include at least one of a positive loop time constant, a speed loop time constant and an acceleration loop gain; and
wherein the motor control apparatus further includes:
detecting means for detecting a value of current or voltage supplied to the motor of the linear motion apparatus, the information processing apparatus is configured such that the acquiring means acquires a parameter and a current waveform or a voltage waveform which is detected when the motor is controlled based on the parameter, from the motor control apparatus, and that the sending means sends the current waveform or the voltage waveform and the parameter to the maintenance server, and the maintenance server receives the current waveform or the voltage waveform and the parameter from the information processing apparatus, and prompts the operator to adjust the received parameter while displaying the current waveform or the voltage waveform and the parameter.

2. The remote maintenance system according to claim 1, wherein the parameter includes a control parameter for use in feedback control of the linear motion apparatus.

3. The remote maintenance system according claim 1, wherein adjustment history of the parameter is accumulated in the maintenance server.

4. A method of performing remote maintenance on a system, said system comprising:
a maintenance server, a linear motion apparatus that is driven by a motor, a motor control apparatus for controlling the motor of the linear motion apparatus, and an information processing apparatus that is connected to the motor control apparatus, and is communicating with the maintenance server through an electric communication line, the method comprising:
acquiring parameters that relate to motor control and are stored in storage means of the motor control apparatus from the motor control apparatus at the information processing apparatus, sending the acquired parameter to the maintenance server at the information processing apparatus, receiving the parameter sent by the information processing apparatus at the maintenance server, prompting an operator to adjust the received parameter while displaying the received parameter at the maintenance server, sending the adjusted parameter to the information processing apparatus at the maintenance server, receiving the parameter adjusted by the maintenance server from the maintenance server at the information processing apparatus, and writing the received parameter into the storage means of the motor control apparatus at the information processing apparatus, wherein said parameters relating to motor control include at least one of a positive loop time constant, a speed loop time constant and an acceleration loop gain; and
wherein the motor control apparatus further includes:
detecting means for detecting a value of current or voltage supplied to the motor of the linear motion apparatus, the information processing apparatus is configured such that the acquiring step acquires a parameter and a current waveform or a voltage waveform which is detected when the motor is controlled based on the parameter, from the motor control apparatus, and that the sending step sends the current waveform or the voltage waveform and the parameter to the maintenance server, and the maintenance server receives the current waveform or the voltage waveform and the parameter from the information processing apparatus, and prompts the operator to adjust the received parameter while displaying the current waveform or the voltage waveform and the parameter.

5. The remote maintenance system according to claim 1, wherein the parameter includes a control parameter for use in feedback control of the linear motion apparatus.

6. The remote maintenance system according to claim 1, wherein adjustment history of the parameter is accumulated in the maintenance server.

7. The remote maintenance system according to claim 2, wherein adjustment history of the parameter is accumulated in the maintenance server.

* * * * *